United States Patent [19]
Leppard

[11] 3,893,827
[45] July 8, 1975

[54] SELECTIVE REMOVAL OF CONSTITUENTS FROM FLUIDS

[75] Inventor: Colin James Leppard, Emsworth, England

[73] Assignee: CJB Development Limited, London, England

[22] Filed: Aug. 15, 1973

[21] Appl. No.: 388,352

[52] U.S. Cl. ............................ 55/25; 55/62; 55/68
[51] Int. Cl. ...................... B01d 53/14; B01d 53/02
[58] Field of Search .......... 210/24, 31 R, 38; 55/62, 55/68, 75, 21, 25

[56] References Cited
UNITED STATES PATENTS

| | | | |
|---|---|---|---|
| 2,606,870 | 8/1952 | Pemberton et al. | 210/31 R X |
| 2,981,681 | 4/1961 | Dunlop | 210/31 R X |
| 3,242,651 | 3/1966 | Arnoldi | 55/75 X |
| 3,312,617 | 4/1967 | Klein | 210/38 X |

Primary Examiner—John Adee
Attorney, Agent, or Firm—Bacon & Thomas

[57] ABSTRACT

A process for removing a first constituent from a fluid, the fluid consisting of three or more constituents which process comprises (i) subjecting the fluid containing said first and second constituents to a first treatment with a reversible absorbent for said second constituent to remove said second constituent therefrom, (ii) removing said first constituent from the fluid in the absence of said second constituent and (iii) subjecting the fluid from which said first constituent has been removed to a second treatment with a reversible absorbent for said second constituent which absorbent has previously absorbed said second constituent, the second constituent being desorbed from said absorbent and being reintroduced into the fluid to produce a product fluid containing said second constituent in the absence of said first constituent.

3 Claims, 3 Drawing Figures

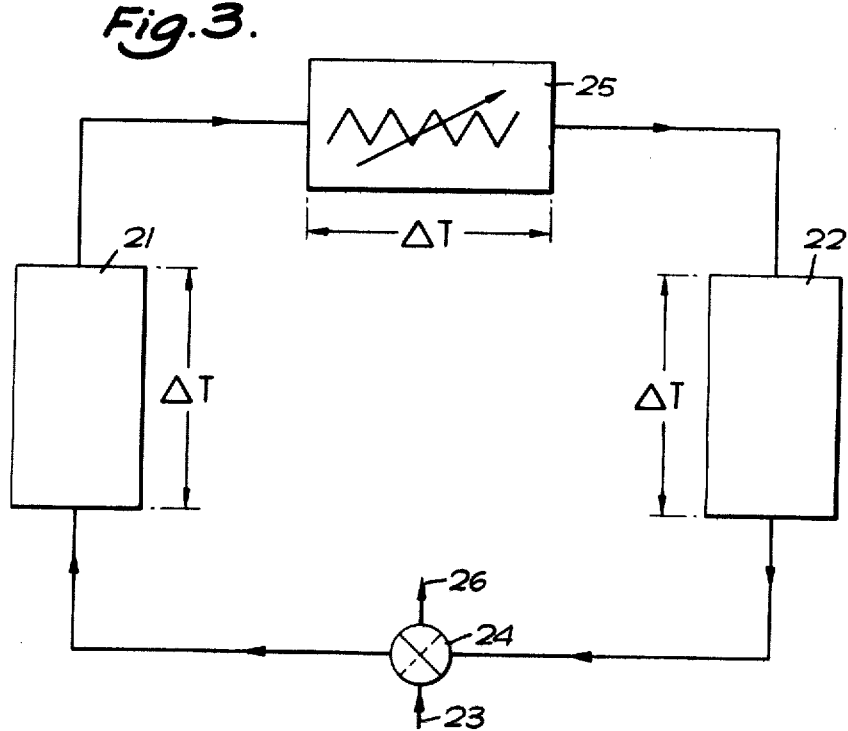

SELECTIVE REMOVAL OF CONSTITUENTS FROM FLUIDS

BACKGROUND OF THE INVENTION

This invention relates to selective removal of constituents from fluids. The term fluid in accordance with the present specification is intended to include both liquids and gases, and to include mixtures of liquids and mixtures of gases, such as air. The constituents may be individual liquids or gases in liquid or gas mixtures respectively, or may be substances dissolved in or suspended in the liquid or gas, including ionic particles. For the purposes of the present specification heat may also be regarded as a constituent of the fluid.

In this specification the term absorb and absorbent will be used. For the purposes of this specification however these terms should be understood to include within their meaning the terms adsorb and adsorbent where, in the context, these latter terms are appropriate.

SUMMARY OF INVENTION

In its broadest aspect the present invention provides a process for removing a first constituent from a fluid, the fluid consisting of three or more constituents, which fluid contains a second constituent whose presence tends to interfere with or to render inconvenient the removal of said first constituent but whose presence is required in, or is not undesired in, the product fluid, which process comprises (i) subjecting the fluid containing said first and second constituents to a first treatment with a reversible absorbent for said second constituent to remove said second constituent therefrom, (ii) removing said first constituent from the fluid in the absence of said second constituent and (iii) subjecting the fluid from which said first constituent has been removed to a second treatment with a reversible absorbent for said second constituent which absorbent has previously absorbed said second constituent, under conditions whereby said second constituent is desorbed from said absorbent and is reintroduced into the fluid to produce a product fluid containing said second constituent in the absence of said first constituent.

DESCRIPTION OF PREFERRED EMBODIMENTS

In performing the process of the invention it is preferable to operate in a cyclical fashion and the direction of the flow may, with advantage (depending on the application of the invention) be reversed before the absorbing material becomes saturated and/or the desorbing material becomes denuded of the second constituent. On the other hand, the flow of fluid may be reversed at or after the desorbing material becomes denuded of the second constituent. On the other hand, the flow of fluid may be reversed at or after saturation of the absorbing material and/or at or after the desorbing material becomes denuded of the second constituent.

In order to speed up the initial establishment of the desired material balance and also to accommodate any incidental energy losses, a slight excess of energy must be added to the system. In the case of gases, this may be conveniently achieved by operating the absorbing bed at a somewhat higher pressure than the desorbing bed, for example, at a pressure of approximately 5 to 10% higher. In the case of liquids the extra energy requirement may be supplied by operating the absorbing bed at a lower temperature than the desorbing bed if the component which it is desired to remove is absorbed to a greater extent at a lower temperature or, alternatively, operating the absorbing bed at a higher temperature if the absorbing component is absorbed to a greater extent at a higher temperature.

Where the means used for removing the first constituent is not capable of indefinite continuous operation means may be provided for incorporating into the flow path of the fluid a substitute or replacement removal means for the first constituent, for example whilst the original removal means is being regenerated for further use. Conveniently this substitution or replacement may take place at the same time as a reversal of fluid flow, when the latter is provided for.

It will be further understood that the invention also provides in its broadest aspect an apparatus for the selective removal of a first constituent from a fluid stream, which fluid stream also contains a second constituent whose presence tends to interfere with, or to render inconvenient, the removal of said first constituent but whose presence is required in, or is not undesired in, the fluid stream, which apparatus comprises a fluid circuit having an inlet and an outlet, the circuit comprising two chambers containing reversible absorbent material and a separate means for removing the undesired constituent from the fluid stream, said separate means being located between said two chambers in the circuit, such that the said chambers are interposed between said separate means and the inlet and outlet. Preferably the inlet and outlet are incorporated in the circuit by valve means whereby in one position of the valve the inlet is connected with one of the chambers and the outlet is connected with the other chamber and in another position the inlet and outlet are connected to the respective chambers in the opposite fashion.

In one particular aspect of the present invention there is provided a process for the removal of a contaminant from a gas or mixture of gases, for example air, which additionally contains another constituent whose presence tends to interfere with the removal of the contaminant from the gas but whose presence is required in, or is not undesired in, the gas, which process comprises (i) subjecting the gas stream containing the contaminant and said other constituent to a first treatment with a reversible absorbent for said other constituent to remove said other constituent from the gas stream (ii) removing the contaminant from the gas stream in the absence of said other constituent and (iii) subjecting the gas stream to a second treatment with a reversible absorbent for said other constituent which absorbent or adsorbent has previously absorbed a quantity of said other constituent, under conditions whereby said second constituent is desorbed from the absorbent and is reintroduced into the gas so as to produce a gas containing said constituent in the absence of the contaminant.

It will be understood that the absorbent materials used for the removal and reintroduction, respectively, of the other constituent into the gas need not necessarily be the same, but in practice it is convenient to use the same type of material, particularly when a cyclical reversal of flow is required.

The following is a description of the application of the above described particular aspect of the present invention. This description shows how the purification of air in enclosed environments may be achieved by the removal of carbon dioxide from a wet air stream by a process in accordance with the present invention.

BRIEF DESCRIPTION OF THE DRAWINGS

FIG. 3 is a flow sheet of a heat removing process.

Figure 1:
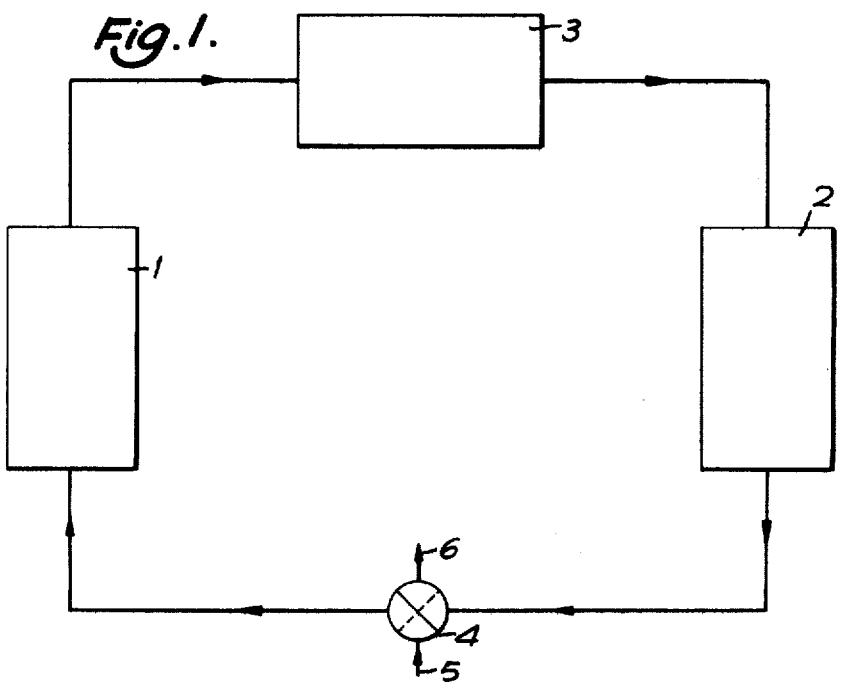
FIG. 1 is a flow sheet diagram of the adsorption process.

Referring to the FIG. 1 of the accompanying drawings, chambers 1 and 2 contain beds of an absorbent selective for water, such as silica gel or 3A molecular sieve, and chamber 3 contains a bed of an adsorbent which will remove carbon dioxide, such as 5A molecular sieve. Vavle 4 is positioned to deflect the feed air 5 (wet and containing carbon dioxide) through chamber 1, where water is removed. The dried gas stream passes through chamber 3 where the carbon dioxide is removed (without the complication of the co-absorption of water). The clean air stream then passes through chamber 2, which has adsorbed water to or beyond break-through during the preceding cycle, when water is desorbed from the bed by the dry air. The air freed of carbon dioxide 6 is then returned through valve 4 to the atmosphere with no overall change in humidity. Chambers 1 and 2 are interchanged cyclically by changing the direction of the flow of feed air using valve 4. The changeover is effected at the time at which breakthrough of water vapour occurs from the absorbing bed.

The regeneration of the carbon dioxide absorption bed may be performed by conventional techniques, such as thermal-swing or pressure-swing regeneration. A second regenerated bed for carbon dioxide absorption may, if desired, be switched into contact with the dry air stream by a suitable valve system (not shown in the Figure), whilst regeneration is taking place.

This particular aspect of the present invention will be illustrated by the following specific Examples.

EXAMPLE 1

Air at a temperature of 20°C and having a relative humidity of 70% was passed through two chambers connected in series at a flow rate of 230 scf/hour. A flow reversal valve of the type shown in FIG. 1 was included. Each chamber was 2 inches in diameter and 19 inches in length and was packed with 10 to 18 mesh silica gel. The air flow between the chambers was restricted so that a pressure drop of 1.0 psi was maintained between the chambers. The air flow was passed in one direction for 4 minutes and the direction of flow was then reversed through the chambers for a further 4 minutes.

This sequence of operations was repeated 60 times, after which the measured dewpoint of the air stream between the two chambers was −72°C. The same dewpoint was maintained for a further period of 24 hours.

EXAMPLE 2

Using the same inlet air conditions, cycle times and chamber sizes as in Example 1, air was passed at a flow rate of 260 scf/hour through two chambers packed with 6 to 10 mesh silica gel. An imposed pressure drop of 2.0 psi was maintained between the chambers. When equilibrium conditions had been established, after approximately 100 cyclical reversals of flow, the dewpoint of the air stream measured between the two chambers was −55°C.

According to another aspect of the present invention there is provided a process for removing a first constituent from a liquid, or carrying out a chemical or electrochemical reaction on the first constituent, which liquid additionally contains a second constituent which is ionic and whose presence tends to interfere with the removal of the said first constituent from the liquid, or with carrying out the chemical or electrochemical reaction on the said first constituent, which process comprises (i) contacting said liquid containing said first and second constituents with an ion exchange resin which selectively exchanges ions with said second constituent to remove said second constituent from the liquid, (ii) removing said first constituent from the liquid, or carrying out the chemical or electrochemical reaction on the said first constituent, and (iii) thereafter treating the liquid freed of said first constituent, or after the said chemical or electrochemical reaction has taken place, with an ion exchange resin under conditions such that ions of said second constituent elute into said liquid. Preferably the ion exchange materials employed for absorption and desorption respectively, of the second constituent are of the same type. Also, as previously explained in connection with the most general aspect of this invention, the process is desirably operated in a cyclic fashion in which the flow of liquid is reversed, optimally when the absorbing ion exchange bed becomes saturated and the desorbing bed becomes denuded, so that the reversal of direction of liquid flow serves to regenerate each bed to the alternative ionic form.

A specific example of the application of this aspect of the present invention lies in the electrolysis of sea water wherein temporary removal of hardness (caused by $Ca^{++}$ and $Mg^{++}$ ions) from the liquid stream entering the electrolytic cell is of great advantage in that the deposition of cathode scales is prevented.

Figure 2:
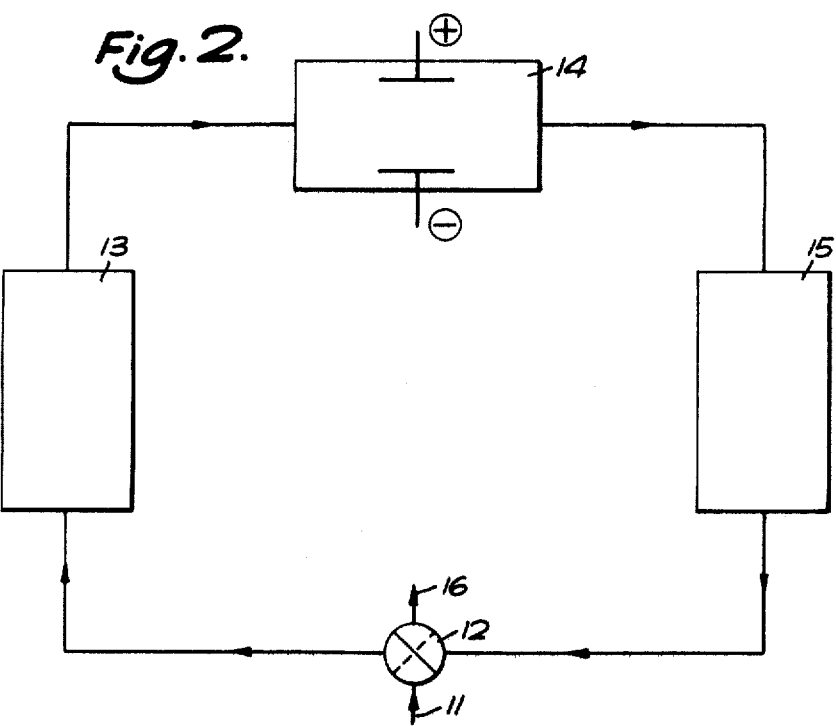
FIG. 2 is a flow sheet of a chemical or electrochemical process.

Referring to FIG. 2 of the accompanying drawings a stream of sea water 11 is passed via valve 12 through a bed 13 of an ion exchange resin in sodium form. The ion exchange resin absorbs $Mg^{++}$ and $Ca^{++}$ ions from the sea water flowing through it. The sea water, free of divalent cations, passes through the electrolytic cell 14 where chloride ions are discharged to produce a dilute hypochlorite solution. The stream of sea water leaving the electrolytic cell, which contains $Na^+$, $Cl^-$ and $OCl^-$ ions is passed through a bed 15 of an ion exchange resin which has absorbed $Mg^{++}$ and $Ca^{++}$ cations during the preceding half cycle. The $Na^+$ ions exchange with the $Mg^{++}$ and $Ca^{++}$ ions to regenerate the bed. The electrolysed sea water then passes via valve 12 as a stream 16 to its subsequent point of use. Beds 13 and 15 are interchanged cyclically by deflecting the sea water flow with the valve 12. The changeover is timed to correspond with the breakthrough of divalent cations from the absorbig bed.

It is of course necessary to use a grade of ion exchange resin which is compatible with the concentration of hypochlorite in the cell effluent.

In a further aspect of the invention the general process described above may be applied to removing heat from, i.e. the cooling of, air or other gases or gas mixtures containing water or other absorbable constituents. According to this aspect of the invention there is provided a process for cooling a gaseous fluid containing an absorbable constituent which process comprises (i) contacting the gaseous fluid with an absorbent for the absorbable constituent so as to raise the temperature of the gaseous fluid due to the heat of absorption liberated by the absorption of the absorbable constituent (ii) cooling the gaseous fluid, and (iii) thereafter contacting the cooled gaseous fluid with absorbent for the absorbable constituent which has previously been saturated or partially saturated with the absorbable constituent, under conditions in which the absorbable constituent is desorbed from the absorbent to cause further cooling of the gaseous fluid.

This aspect of the present invention may be employed in the air conditioning of buildings and other enclosed spaces, and the following specific example shows how air from the inside of a building may be cooled to a temperature corresponding to the dew point temperature of the air entering the air conditioning plant. Referring to FIG. 3 of the accompanying drawings the absorption beds 21 and 22 are packed with a regenerable desiccant such as molecular sieve or silica gel or activated alumina. A stream of air 23 at ambient conditions of temperature and humidity is passed via valve 24 to bed 21 where water is adsorbed and the air temperature is raised by say $\Delta T$ due to the liberation of the heat of adsorption. The air stream then passes through an air-cooled (or water-cooled) heat exchanger 25 which is effectively outside of the environment whose temperature it is desired to reduce, where the temperature of the air stream is reduced to ambient. The air stream then passes to bed 22 which has adsorbed water during the preceding half cycle. The dry air stream desorbs the water and this is accompanied by a decrease in temperature corresponding to the removal of heat from the air stream due to the negative heat of desorption. The cooled air stream 26 passes back into the room via the valve 24. A cyclic change of the direction of flow of the air stream by means of the valve 24 provides for continuous operation, as the effective changeover of adsorbing and desorbing beds is made to correspond to the breakthrough of water from the adsorbing bed.

As the amounts of water adsorbed and desorbed are equal (because an equal volume of air is passed through both beds in any time) the same temperature difference ($\Delta T$) will be obtained across both beds. However, the temperature drop across the desorbing bed will be limited. The limitation is brought about for the following reasons. As the temperature through the desorbing bed reduces and the humidity of the air stream simultaneously increases, the dewpoint temperature will ultimately be obtained. At this point, the air stream will have no further capacity for water vapour and so no further desorption of water from the bed will occur. Thus, during the next half cycle, when this bed is adsorbing, it will have a lower capacity for water (because it was incompletely regenerated). Therefore, when the system is in equilibrium, the maximum decrease in temperature will be related to the inlet temperature and pressure and to the rate of absorption of the system.

The above-described specific examples are not intended to limit the scope of this invention and other applications of the general process and apparatus of the invention will be apparent. However, the above examples serve to show how, by operating the process of the invention cyclically, the removal and subsequent reintroduction of one or more constituents of a fluid may be achieved in a continuous manner by the alternate exhaustion and regeneration of an absorbing or adsorbing means, whilst at the same time enabling another constituent of the fluid to be removed more conveniently during the temporary absence from the fluid of the first mentioned constituent.

I claim:
1. A process for removing a first constituent from a gas containing at least a first, second and third constituent wherein said second constituent interferes with the removal of said first constituent, which process comprises the steps of:
   (i). subjecting the gas containing said first and second constituents to a first treatment with a first bed of a reversible absorbent for said second constituent to remove said second constituent therefrom;
   ii. removing said first constituent from the gas treated in step (i);
   iii. subjecting the product gas of step (ii) to a second treatment with a second bed of a reversible absorbent for said second constituent which absorbent has previously absorbed said second constituent, the second constituent being desorbed from said second bed of reversible absorbent and being reintroduced into the gas to produce a product gas containing said second constituent in the absence of said first constituent;
   iv. operating steps (i), (ii) and (iii) in a cyclical manner by reversing the direction of flow of the gas before said absorbent becomes saturated and before the desorbing material becomes denuded of the second constituent; energy being supplied to the system to accommodate incidental energy losses during operation solely by operating the first treatment in step (i) at a pressure which is higher than that of the second treatment in step (iii).

2. The process of claim 1 wherein the pressure of the first treatment step is approximately 5–10% higher than that of the second treatment step.

3. The process of claim 1 wherein the gas is air containing water and carbon dioxide.

* * * * *